Aug. 9, 1960   A. BREWSTER   2,948,345
SOIL BUFFER

Filed Nov. 6, 1957   2 Sheets-Sheet 1

INVENTOR
ALBERT BREWSTER

BY *Beale & Jones*

ATTORNEYS

Aug. 9, 1960    A. BREWSTER    2,948,345
SOIL BUFFER
Filed Nov. 6, 1957    2 Sheets-Sheet 2
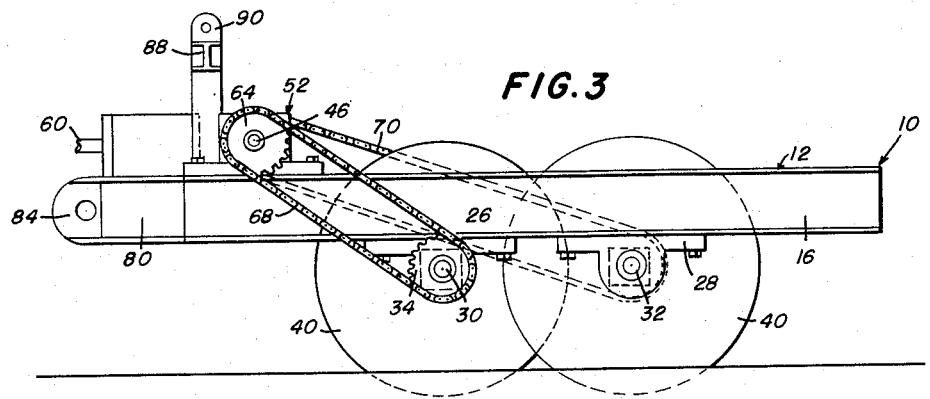
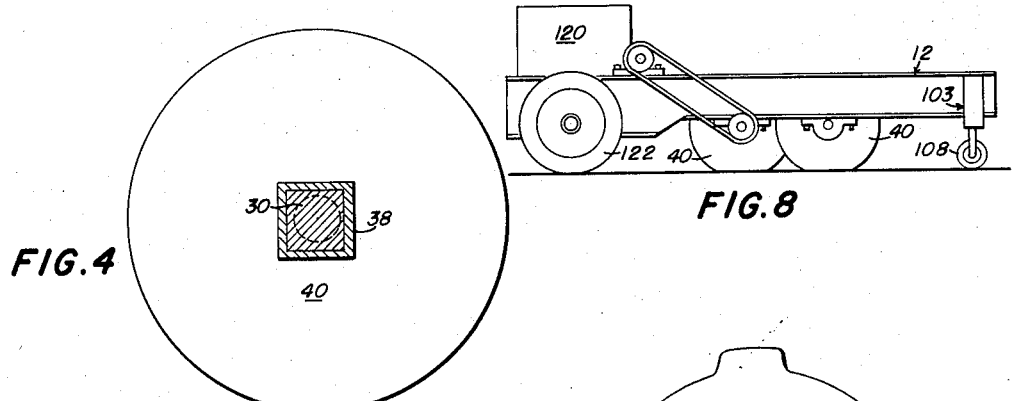
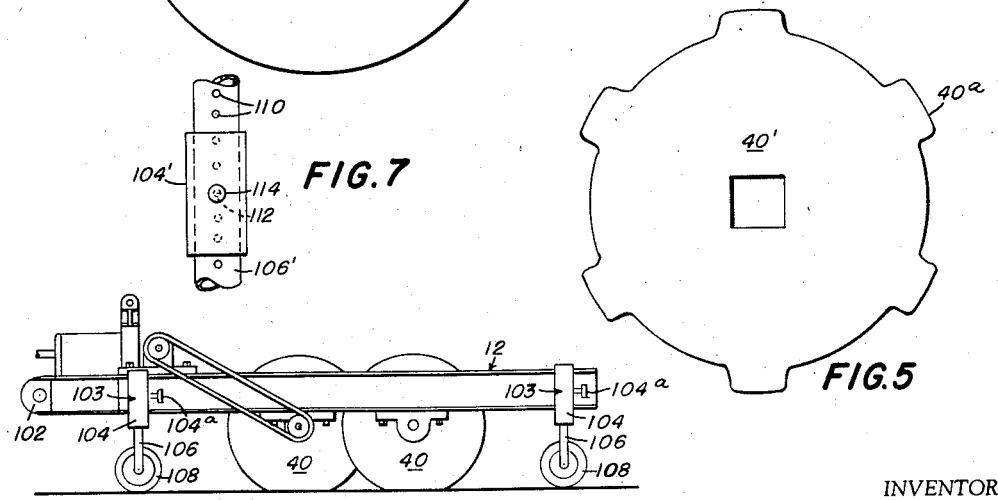
INVENTOR
ALBERT BREWSTER
BY *Beale & Jones*
ATTORNEYS

United States Patent Office 2,948,345
Patented Aug. 9, 1960

2,948,345

SOIL BUFFER

Albert Brewster, 3305 W. 8th St., Yuma, Ariz.

Filed Nov. 6, 1957, Ser. No. 694,831

1 Claim. (Cl. 172—49)

This invention relates to a soil buffer. More specifically, this invention relates to a device for cultivating the ground with unique thoroughness and means for selectively controlling the manner in which the ground is cultivated.

In the prior art, devices have been known for cultivating the ground by means of dragging disking devices thereover. Also, it has been common to cultivate the ground by means of a driven rotary tool similar to a paddle wheel.

The drawback of the cultivation devices used in the prior art is that none of them have picked up the soil and completely overturned it to expose the underside, and have comminuted it in so doing. The present apparatus effects this overturning and comminution in a simple way which will be recognized by those skilled in the art as a tremendous advance in the field of soil cultivation.

It is, therefore, an object of this invention to provide an apparatus adapted to cultivate soil by overturning it and by comminuting it.

A further object of this invention is to provide a device adapted to comminute soil in cultivating it, the degree of said comminution being selectively controllable by means of the device.

Another object of this invention is to provide a device for cultivation comprising a plurality of parallel disking devices, the speed of one of which may be changed relative to the speed of the other to effect varying degrees of cultivation.

A further object of this invention is to provide a powered cultivating device adapted to be powered by the draft vehicle or by an independent power source.

Still a further object of this invention is to provide in a device for cultivating novel means for determining the depth of the cultivating tool.

This invention embodies other novel features, details of construction and arrangement of parts which are hereinafter set forth in the specification and claim, and illustrated in the accompanying drawings, wherein:

Fig. 3 is an enlarged side elevational view of the device of my invention;

Fig. 4 is an enlarged shaft and spacer section taken on the line 4—4 of Fig. 2.

Fig. 5 is a view of a modified ground-engaging disk adapted to be used with this invention;

Fig. 6 is a side view of a modified form of the invention;

Fig. 7 is a slightly enlarged fragmentary elevational view showing a modified adjustable support; and Fig. 8 is a reduced side elevational view of the self-propelled modification of my invention.

Briefly, the invention is a soil buffer comprising a frame, a pair of parallel disk shafts journaled in and extending across the frame, each of said shafts having fixedly mounted thereon and in oblique relation thereto a plurality of spaced ground-engaging disks. The disk shafts are close enough together so the disks on one shaft intermesh with the disks on the other shaft. The invention includes means for driving the disk shafts and means for spacing the frame above the ground.

Figure 1:
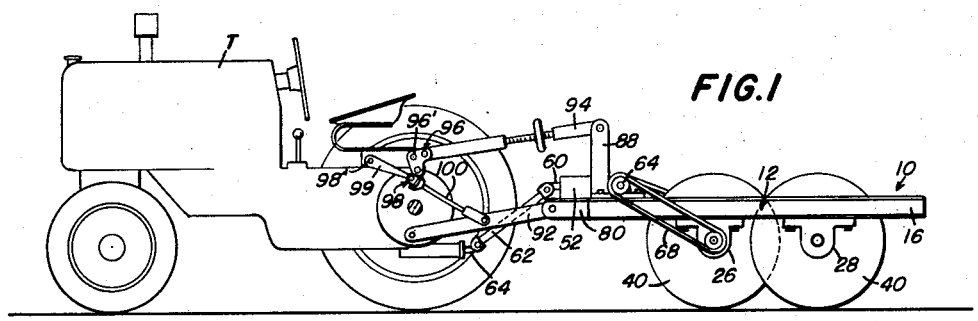
Fig. 1 is a side elevational view of the invention behind a draft vehicle, the left rear wheel of the vehicle being removed to expose the hitch and power take-off linkages.
Figure 2:
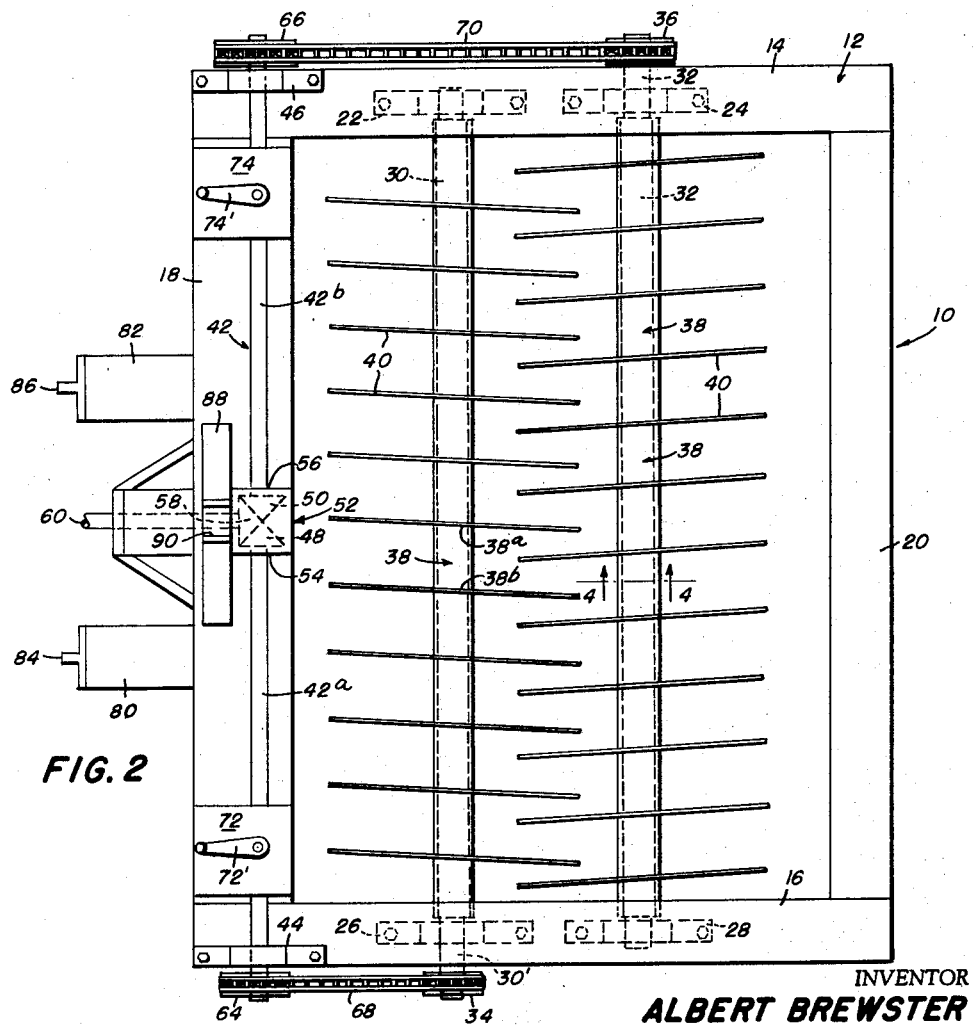
Fig. 2 is an enlarged plan view of the device of my invention.

More specifically, the soil buffer of my invention is broadly designated 10 in Fig. 1. As shown, it may be drawn by a tractor T. As shown in Fig. 2, the soil buffer comprises a flat rectangular frame 12 including side members 14 and 16, the ends of which are attached to parallel front and rear members 18 and 20, respectively. The rectangular frame 12 may be composed of channels, I-beams or any other suitable shapes welded or otherwise fastened to each other at the corners. Mounted on the underside of each of the side members 14 and 16 of the rectangular frame 12 are a plurality of pillow block bearings 22, 24, 26 and 28. Each bearing is aligned with a bearing on the opposite side member. In the aligned bearings are journaled transversely disposed disk shafts 30 and 32. An end 30' of the disk shaft 30 extends beyond the bearing 26 and has mounted thereon a sprocket 34. On the opposite side of the frame 12 the end 32' of disk shaft 32 extends beyond its bearing 24 in a similar manner and carries the sprocket 36.

Intermediate the side members 14 and 16 both disk shafts 30 and 32 are formed with a rectangular or square cross section, see Fig. 4. In this area each disk shaft receives alternating spacers 38 and disk members 40. The opposite ends 38a and 38b of each spacer 38 are cut off in parallel planes oblique to the longitudinal axis thereof. To prevent their rotating with respect to the shaft 30 or 32, the disk members 40 have their central apertures in a shape approximately that of the disk shafts 30 and 32 intermediate these ends. With this spacing arrangement it can be seen that each ground-engaging disk member 40 on one shaft are disposed in a plane parallel to the remaining disk members on the shaft, all of said planes being oblique to the axis of the shaft.

As is shown in Fig. 2, the distance between the two disk shafts 30 and 32 is closed enough so that the disks 40 on the two shafts intermesh. Less functionally phrased, the distance between the two drive shafts 30 and 32 is less than twice the radius of a disk 40, assuming all disks to be the same size. By this intermeshing of the oblique disks on the two drive shafts when the speed of rotation of the two shafts is not the same or when the disks are "out of step" a squeezing action which serves to pick up and turn over soil to cultivate it efficiently is created. Also the soil is violently forced in alternate directions transverse to the path of the buffer, comminuting it more.

Aside from the circular configuration of the ground-engaging disk members 40 as shown in Figs. 1, 3, and 4, the ground-engaging disks may be formed as shown at 40' in Fig. 5 with peripheral projections 40a thereabout. The projections 40a serve to mince and cut the soil to a finer degree than is achieved by the standard circular disks.

Comprising means for driving the disk shafts 30 and 32 is intermediate shaft means 42 journaled for rotation in pillow block bearings 44 and 46 disposed in aligned relation on either side member 16, 14 of the rectangular frame 12. Centrally of the front member 18 of the frame 12 the intermediate shaft means 42 is interrupted and the two ends formed thereby receive each a beveled gear 48 and 50 (shown in phantom). A housing 52 protecting these gears mounted in the center of the front member 18 has apertures 54 and 56 at either side. The apertures carry bearings adapted to support the portions of shaft means 42 for rotation. Meshing with the two bevels 48 and 50 is a drive bevel 58 which is mounted on the rear end of a power shaft 60 obtaining power either through a linkage 62 equipped with universals from a takeoff 64 on a draft vehicle T as shown in Fig. 1, or from an independent power source. As shown in Fig. 2, the opposite ends of the intermediate shaft means 42 are equipped with sprockets 64 and 66 aligned with the sprockets 34 and 36 respectively. Roller chains 68 and 70 are trained over the aligned sprockets respectively to rotatably connect them. Thus torque imparted to the power shaft 60 is transmitted through the intermediate shaft means 46 and chained to the disk shafts 30 and 32.

Intermediate the pillow block bearings 44 and 46 and the power shaft gearing housing 52 and interrupting the two portions 42a and 42b of intermediate shaft means 42 are the transmission boxes 72 and 74 respectively. Within each box are means for effecting transmission of torque from the inside length of portions 42a and 42b to the outside portions thereof respectively in one of two or more speeds selectively. The speeds are selected by means of the operating arm 72' and 74' mounted on the exterior of each box. The gearing arrangement within the transmission boxes is of the conventional type and is not the subject of this application.

With two different speeds available for each of the disk shafts 30 and 32, it is readily seen that one shaft may be either overdriven or underdriven in relation to the other. It is by this unique means, coupled with the oblique disposition of the disks 40 that varying degrees of cultivation are achieved. For instance, the disks may be used to cut, stir, mulch, renovate, or order the soil.

The soil buffer may be towed by a draft vehicle T as shown in Fig. 1 or independently propelled by traction means of its own. If it is drawn by a draft vehicle T, means for spacing the horizontal rectangular frame of the soil buffer above the ground at the desired distance may be inherent in the hitch as shown in Fig. 1 or achieved by ground-engaging spacing means as shown in Fig. 6.

With the hitch-type spacing means shown in Fig. 1, the front member 18 of the rectangular frame is formed with forward extensions 80—82 terminating at their distal end in blocks 84—86 respectively. The extensions 80—82 are offset from the center of the front member. Additionally, the front member 18 is provided with a pair of upstanding converging arms 88 terminating at their upper ends in a yoke member 90 forming a hitch block. By means of the three blocks the soil buffer may be drawn utilizing a three point hitch having automatic depth control of the Ferguson type. As is well known in the art, the hitch linkages include (see Fig. 1) the drawbars 92 extending pivotally rearwardly from either side of the tractor differential and having their rear ends apertured and pinned to the blocks 84 and 86 respectively and the top bar on link 94 of adjustable length apertured rearwardly and pinned to the top hitch block or yoke 90. An L-shaped linkage 96 is pivoted at the end of one arm to the tractor frame while its other arm is connected to the forward end of the top bar or link 94. The vertex 96' of the L-shaped member is connected to valve means (not shown) adapted to control a hydraulic system terminating in a piston or the like adapted to rotate the lift arms 98 pivoted at 98'. The lift arm comprises the crank 99 connected by universal means to one end of a linkage 100 the other end of which is attached to the adjacent drawbar 92. One lift arm 98 is provided on either side of the tractor for the adjacent drawbar. By the three point hitch arrangement shown in Fig. 1, the settling of the soil buffer into the soil more than the desired amount, according to the setting of the adjusting means of link 94, will cause tension on the top bar 94, actuating the hydraulic system to raise the drawbars 92.

Alternately (as shown in Fig. 6), the soil buffer may be towed by a single point block 102 secured to front 18'. To space the horizontal rectangular frame 12' of the soil buffer the desired distance above the ground, adjustable support means 103 are provided. By this means each corner of the frame is provided with a vertically disposed tubular member 104. Slidable in each of these tubular members is a shaft 106 terminating at its lower end in the ground-engaging member 108. Each tubular member 104 is provided with a radially extending set screw 104a adapted to be tightened to fix the shaft at the desired height in the tubular member 104. Alternately, (see Fig. 7), the shaft may have a plurality of transverse holes 110 at varying heights and the tubular member 104' may have a transverse hole 112. A pin 114 may be used to fix the shaft when the desired hole in the shaft is brought into alignment with the hole 112 in the tubular member. Thus, the height of the frame 12 is established.

As stated above, the device of the invention may be a self-propelled unit. As shown in Fig. 8, the self-propelled unit usually requires an enlargement of frame 12 to accommodate an engine 120 on the forward end thereof. Suitable drive means are employed between the engine and drive wheels 122 mounted on either side of the frame 12. Frame 12 is of adjustable height with respect to the wheels 122. At the rear corners of frame 12 are provided adjustable supports 103 as described above in either of its modifications. Steering means may involve simply means (not shown) for pivoting the vertical shaft 106. The engine 120 of course drives the disk shafts in this form of the device.

It will be obvious to those skilled in the art that I have developed a cultivating device which is of unique flexibility in that the degree of cultivation which it achieves is infinitely variable. By means of intermeshing disks on side-by-side parallel disk shafts, said disks being obliquely mounted, and by means of variable speed drive means, unique cultivation effects can be achieved.

While this invention has been shown in limited forms, it is obvious to those skilled in the art that it is not limited but is susceptible of various changes and modifications without departing from the scope and spirit of the claimed invention.

I claim:

A soil buffer comprising a horizontally disposed open rectangular frame including a pair of parallel side members and parallel front and rear members connected to the ends of said side members, adjustable support means adapted to space said horizontal frame above the ground, a pair of spaced bearings mounted on each side member, each bearing being aligned with a corresponding bearing on the opposite side member, parallel disk shafts journaled for rotation in said aligned bearings, each of said shafts having fixedly secured thereon a plurality of ground-cultivating disks, the disks of each shaft respectively parallel to each other and all of said disks being mounted oblique to the shaft on which they are carried, said disks being spaced by tubular spacer members each having its ends cut off oblique to its longitudinal axis, said disk shafts being close enough together so that the disks on one shaft intermesh with the disks on the other shaft, drive means adapted to be driven by a power takeoff from a propelling vehicle, said drive means being operatively connected to said shafts and including individual gear boxes adapted to change speed of each of said shafts respectively with relation to the other of said shafts, whereby an occasional pinching action of the soil between the intermeshing disks on the two shafts may be assured.

References Cited in the file of this patent

UNITED STATES PATENTS

| | | |
|---|---|---|
| 274,267 | Cameron | Mar. 20, 1883 |
| 344,293 | Tschantz | June 22, 1886 |
| 944,690 | Olson | Dec. 28, 1909 |
| 1,158,109 | Cook et al. | Oct. 26, 1915 |
| 1,316,990 | White | Sept. 23, 1919 |
| 1,389,512 | Juopperi | Aug. 30, 1921 |
| 2,256,185 | Ariens | Sept. 16, 1941 |
| 2,526,396 | Nowlin | Oct. 17, 1950 |
| 2,722,876 | London | Nov. 8, 1955 |